United States Patent
Tsuchida et al.

(10) Patent No.: US 9,800,096 B2
(45) Date of Patent: Oct. 24, 2017

(54) INTERIOR PERMANENT MAGNET SYNCHRONOUS MOTOR WITH OPTIMIZED THICKNESSES AND SECTIONAL AREAS

(71) Applicant: Mitsubishi Electric Corporation, Tokyo (JP)

(72) Inventors: Kazuchika Tsuchida, Tokyo (JP); Tomoaki Oikawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 420 days.

(21) Appl. No.: 14/409,787

(22) PCT Filed: Jul. 18, 2013

(86) PCT No.: PCT/JP2013/069563
§ 371 (c)(1),
(2) Date: Dec. 19, 2014

(87) PCT Pub. No.: WO2014/014073
PCT Pub. Date: Jan. 23, 2014

(65) Prior Publication Data
US 2015/0200570 A1    Jul. 16, 2015

(30) Foreign Application Priority Data
Jul. 19, 2012    (WO) .................. PCT/JP2012/068397

(51) Int. Cl.
*H02K 1/27*    (2006.01)
*H02K 1/06*    (2006.01)
*H02K 21/14*   (2006.01)

(52) U.S. Cl.
CPC ............ *H02K 1/06* (2013.01); *H02K 1/276* (2013.01); *H02K 1/2766* (2013.01); *H02K 21/14* (2013.01); *H02K 2213/03* (2013.01)

(58) Field of Classification Search
CPC ............ H02K 1/06; H02K 1/27; H02K 1/276; H02K 1/2766; H02K 21/14; H02K 21/12; H02K 2213/03
See application file for complete search history.

(56) References Cited

U.S. PATENT DOCUMENTS 6,218,753 B1 *  4/2001  Asano et al. .......... H02K 21/12
                                                        310/156
2006/0220485 A1  10/2006  Shim et al.
(Continued)

FOREIGN PATENT DOCUMENTS

JP    H09-266646 A    10/1997
JP    H10-14190 A     1/1998
(Continued)

OTHER PUBLICATIONS

Office Action dated Aug. 4, 2015 in corresponding JP application No. 2014-525875 (with English translation).
(Continued)

*Primary Examiner* — Michael Andrews
(74) *Attorney, Agent, or Firm* — Posz Law Group, PLC

(57) ABSTRACT

In the rotor core, three or more magnet housing holes for housing magnets are formed in the circumferential direction, and when it is assumed that a stack thickness of the rotor core is X, a stack thickness of the stator core is Y, a sectional area of a core portion surrounded by a line connecting midpoints of an inner diameter side surface of each of the magnet housing holes is S3, a sectional area of an outer-peripheral-side core portion provided between an outer diameter side surface of each of the magnet housing holes and an outer periphery of the rotor core is S2, a sectional area obtained by subtracting the sectional area S2 and the sectional area S3 from a sectional area of the rotor core is S1, the rotor stack thickness is formed so as to satisfy the relation of $X>Y$ and $X<Y(1+(S2/S1)\times 2)$.

5 Claims, 10 Drawing Sheets

(56) References Cited

U.S. PATENT DOCUMENTS

| | | | | |
|---|---|---|---|---|
| 2008/0247888 A1* | 10/2008 | Akashi et al. | .......... | F04B 17/00 |
| | | | | 417/410.1 |
| 2008/0265705 A1* | 10/2008 | Kinoshita | .............. | H02K 21/14 |
| | | | | 310/156.44 |
| 2011/0121677 A1* | 5/2011 | Ley et al. | .............. | H02K 21/12 |
| | | | | 310/156.53 |

FOREIGN PATENT DOCUMENTS

| | | |
|---|---|---|
| JP | 2000-116044 A | 4/2000 |
| JP | 2000-287423 A | 10/2000 |
| JP | 2006-211801 A | 8/2006 |
| JP | 2006-280021 A | 10/2006 |
| JP | 2006-288185 A | 10/2006 |
| JP | 2007-110863 A | 4/2007 |

OTHER PUBLICATIONS

International Search Report of the International Searching Authority dated Oct. 1, 2013 for the corresponding international application No. PCT/JP2013/069563 (and English translation).

\* cited by examiner

INTERIOR PERMANENT MAGNET SYNCHRONOUS MOTOR WITH OPTIMIZED THICKNESSES AND SECTIONAL AREAS

CROSS REFERENCE TO RELATED APPLICATION

This application is a U.S. national stage application of International Patent Application No. PCT/JP2013/069563 filed on Jul. 18, 2013, and is based on International Patent Application No. PCT/JP2012/068397 filed on Jul. 19, 2012, the contents of which are incorporated herein by reference.

TECHNICAL FIELD

The present invention relates to an interior permanent magnet synchronous motor (IPMSM) in which a permanent magnets are embedded in a rotor core.

BACKGROUND

A general method to achieve high magnetization in an interior permanent magnet synchronous motor is to increase both the axial length (rotor stack thickness) of a rotor core and the axial length (stator stack thickness) of a stator core. However, in such a configuration, the used amount of copper, iron, and magnet, which are basic constituent materials of the motor, increases to cause a cost increase, which is not preferable. In a conventional interior permanent magnet synchronous motor represented by Patent Literature 1 mentioned below, the rotor stack thickness is formed larger than the stator stack thickness (to overhang the stator). Therefore, the direct material cost includes only the iron and magnet that constitute a rotor, thereby enabling to suppress the manufacturing cost. Furthermore, in the conventional technique, a magnetic flux generated from an outer periphery of a permanent magnet provided in a portion (an overhanging portion) extending in the axial direction of the rotor core passes a magnetic pole section of the rotor in the overhanging portion and acts on the stator core as an effective magnetic flux, and thus the efficiency is improved.

Patent Literature

Patent Literature 1: Japanese Patent Application Laid-open No. 2000-116044

The magnetic flux density of an outer-peripheral-side core portion of the rotor core becomes high as the length (a difference between the stator stack thickness and the rotor stack thickness) of the overhanging portion increases, and when the length of the overhanging portion reaches a predetermined length, an effective magnetic flux amount saturates. That is, the magnetic flux cannot be used effectively only by increasing the length of the overhanging portion. Therefore, the relationship between a sectional area of the rotor core and an area of the outer-peripheral-side core portion of the rotor core, through which the magnetic flux passes, becomes important. Meanwhile, a permissible overhang amount varies according to the size of the motor. Therefore, the relationship between the stator stack thickness and the rotor stack thickness also becomes important. However, in the conventional technique represented by Patent Literature 1 mentioned above, because these relationships are not taken into consideration, there is a problem in that it is impossible to meet the needs to achieve further reduction of the manufacturing cost while realizing high efficiency of the motor.

SUMMARY

The present invention has been achieved in view of the above problems, and an object of the present invention is to provide an interior permanent magnet synchronous motor that can achieve further reduction of the manufacturing cost while realizing high efficiency of the motor.

In order to solve the aforementioned problems, an interior permanent magnet synchronous motor including a rotor core formed by stacking a plurality of electromagnetic steel plates, and a stator core arranged on an outer peripheral side of the rotor core formed by stacking a plurality of electromagnetic steel plates, wherein three or more magnet housing holes for housing magnets, which are arranged in number corresponding to the number of poles in a circumferential direction of the rotor core and constitute a magnetic pole are formed in the rotor core in the circumferential direction, and when it is assumed that a stack thickness of the rotor core is X, a stack thickness of the stator core is Y, a sectional area of a core portion surrounded by a line connecting midpoints of an inner diameter side surface of each of the magnet housing holes is S3, a sectional area of an outer-peripheral-side core portion provided between an outer diameter side surface of each of the magnet housing holes and an outer periphery of the rotor core is S2, a sectional area obtained by subtracting the sectional area S2 and the sectional area S3 from a sectional area of the rotor core is S1, and a magnetic force of the magnet is "a", the rotor core is formed so as to satisfy the relation of X>Y and X<Y(1+(S2/S1)/a×2), with opposite ends thereof overhanging opposite ends of the stator core.

According to the present invention, a rotor manufactured by taking into consideration the relationship between the sectional area of the rotor core and the area of the outer-peripheral-side core portion of the rotor core, through which the magnetic flux passes, and the relationship between the stator stack thickness and the rotor stack thickness is used. Accordingly, further reduction of the manufacturing cost can be achieved while realizing high efficiency of the motor.

DETAILED DESCRIPTION

Exemplary embodiments of an interior permanent magnet synchronous motor according to the present invention will be explained below in detail with reference to the accompanying drawings. The present invention is not limited to the embodiments.

Embodiment

Figure 1:
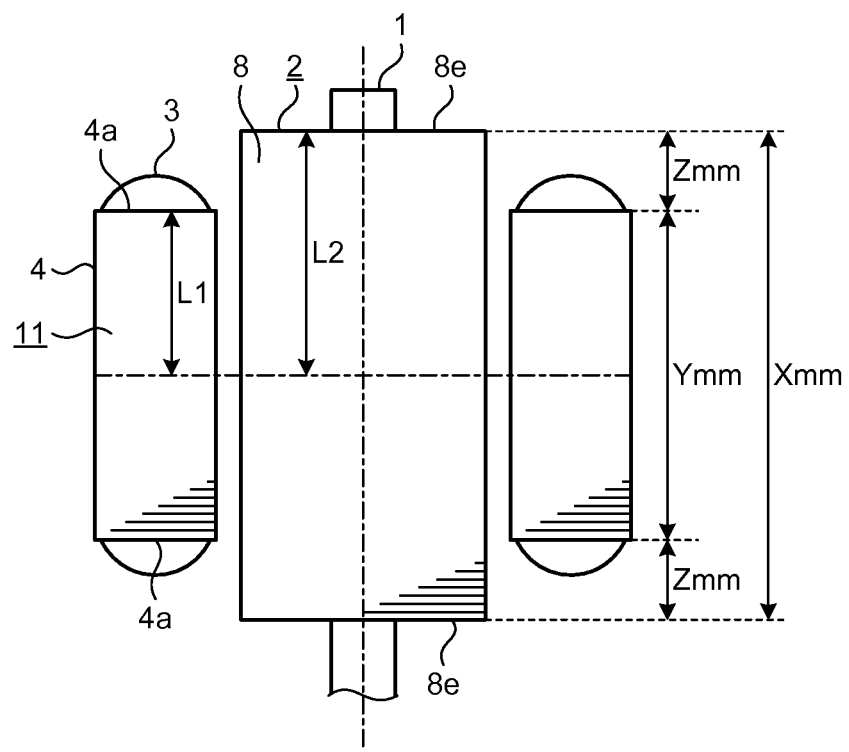
FIG. 1 is a side view of an interior permanent magnet synchronous motor according to an embodiment of the present invention.
Figure 2:
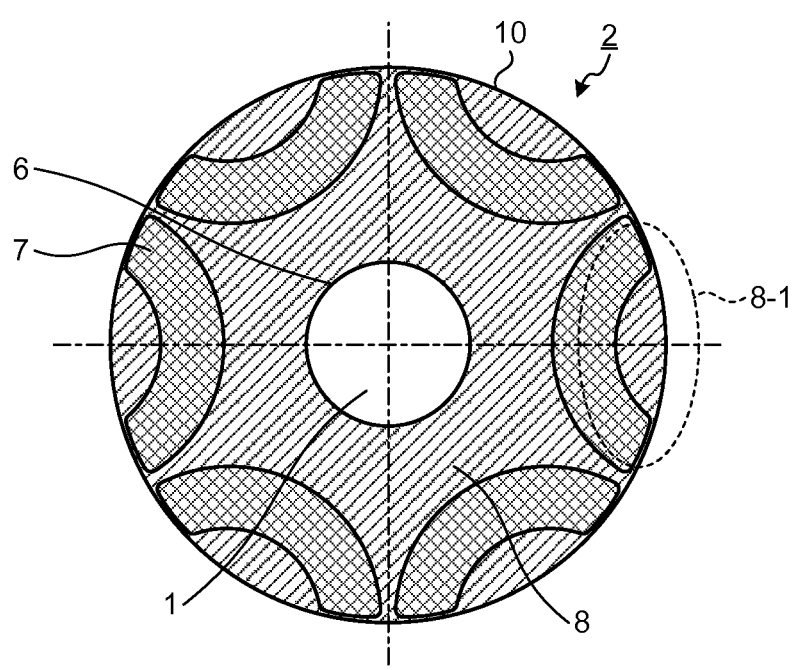
FIG. 2 is a sectional view of a rotor shown in FIG. 1.
Figure 3:
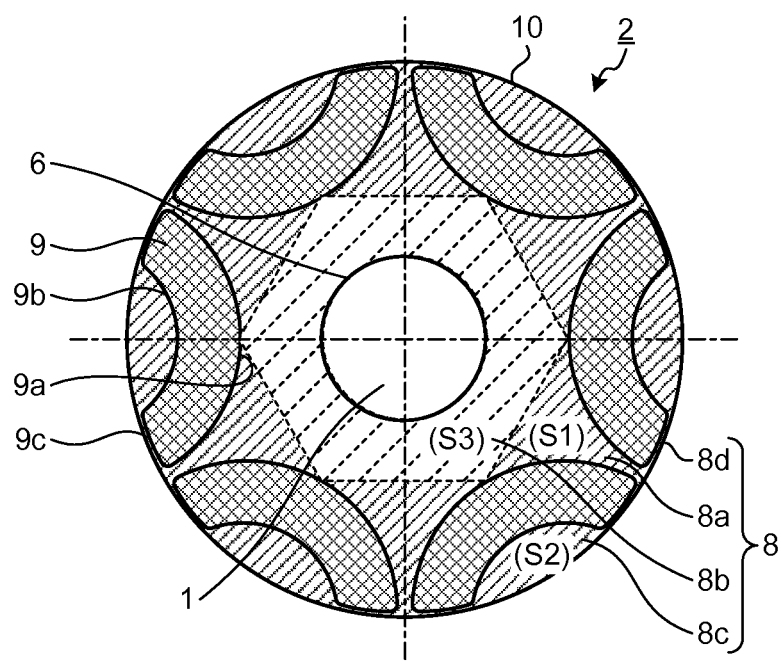
FIG. 3 is a sectional view of a rotor core shown in FIG. 1.
Figure 4:
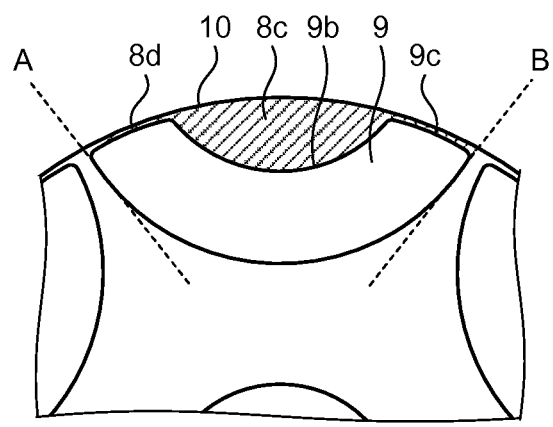
FIG. 4 is an enlarged view of an outer-peripheral-side core portion.

FIG. 1 is a side view of an interior permanent magnet synchronous motor according to an embodiment of the present invention. FIG. 2 is a sectional view of a rotor 2 shown in FIG. 1. FIG. 3 is a sectional view of a rotor core 8 shown in FIG. 1. FIG. 4 is an enlarged view of an outer-peripheral-side core portion 8-1.

The interior permanent magnet synchronous motor shown in FIG. 1 is configured to include a stator 11 and the rotor 2. The stator 11 is configured to include, as main constituent elements, a stator core 4 formed by stacking a plurality of silicon steel plates punched out by a mold, referred to as "punched iron core plates", in the axial direction of a rotation shaft 1, and a winding 3 wound around the stator core 4. The rotor 2 is rotatably arranged on an inner peripheral side of the stator 11. The rotor 2 is configured to include, as main constituent elements, a rotation shaft 1 for transmitting a rotational energy and a rotor core 8 provided on the outer periphery of the rotation shaft 1. Similarly to the case of the stator core 4, the rotor core 8 is manufactured by stacking a plurality of silicon steel plates punched out by a mold in the axial direction of the rotation shaft 1, and is formed in a cylindrical shape.

In the following explanations, an axial length of the rotor core 8 is referred to as "rotor stack thickness X", and an axial length of the stator core 4 is referred to as "stator stack thickness Y". The difference between the length L1 from the center of the stator core 4 to its axial end 4a and a length L2 from the center of the rotor core 8 to an axial end 8e is referred to as "overhanging length Z". The rotor stack thickness X shown in FIG. 1 becomes a size obtained by adding a double length of the overhanging length Z (Z×2) to the stator stack thickness Y.

In FIG. 3, magnet housing holes 9 are formed in the rotor core 8 on the same circumference along the circumferential direction. Each magnet housing hole 9 is arranged on the side of an outer periphery 10, and the center of curvature thereof is formed in an inverted arcuate shape and is positioned outside in the radial direction of the rotor 2. Specifically, the magnet housing hole 9 is formed such that a surface (an outer-diameter side surface 9b) on the side of the outer periphery 10 and a surface (an inner-diameter side surface 9a) on the side of an inner periphery 6 of the rotor 2 are both formed in a curved and protruding shape toward the rotation shaft 1 side, and a circumferential end 9c is positioned near the outer periphery 10 side. An outer edge shape of a magnet 7 shown in FIG. 2 is substantially similar to an inner edge shape of the magnet housing hole 9, and the magnet 7 is housed in the respective magnet housing holes 9.

In FIG. 3, the rotor core 8 includes an outer-peripheral side core 8c formed between the outer periphery 10 and the outer-diameter side surface 9b, an outer-peripheral side thin core 8d formed between the outer periphery 10 and the circumferential end 9c, a center side core 8b formed on the center side of the rotor 2 so as to surround the rotation shaft 1, and an inner-peripheral side core 8a formed between the center side core 8b and the inner-diameter side surface 9a. The center side core 8b is a portion (a portion surrounded by a hexagonal broken line) surrounded by a line connecting the centers of the inner-diameter side surfaces 9a of the respective magnet housing holes 9.

In FIG. 4, a portion, which is surrounded by tangent lines A and B that come in contact with outer peripheral edge portions where each magnet housing hole 9 comes closest to adjacent other magnet housing holes, the outer periphery 10, the circumferential end 9c and the outer-diameter side surface 9b, becomes a total sum of an area of the outer-peripheral side thin core 8d and an area of the outer-peripheral side core 8c. In the following explanations, a core portion obtained by adding the outer-peripheral side thin core 8d and the outer-peripheral side core 8c is referred to as "outer-peripheral-side core portion 8-1".

In FIG. 3, a sectional area S1 of the inner-peripheral side core 8a described above, a sectional area S2 of the outer-peripheral-side core portion 8-1, and a sectional area S3 of the center side core 8b are shown. The sectional area S1 indicates an area obtained by subtracting the sectional areas S2 and S3 from the sectional area of the rotor core 8. The interior permanent magnet synchronous motor according to the present embodiment is configured in such a manner that the stator stack thickness Y, the rotor stack thickness X, the sectional area S1, and the sectional area S2 satisfy the following relationships.

$$X - Y > 0 \text{ mm} \tag{1}$$

$$X < Y(1 + (S2/S1) \times 2) \tag{2}$$

Figure 5:
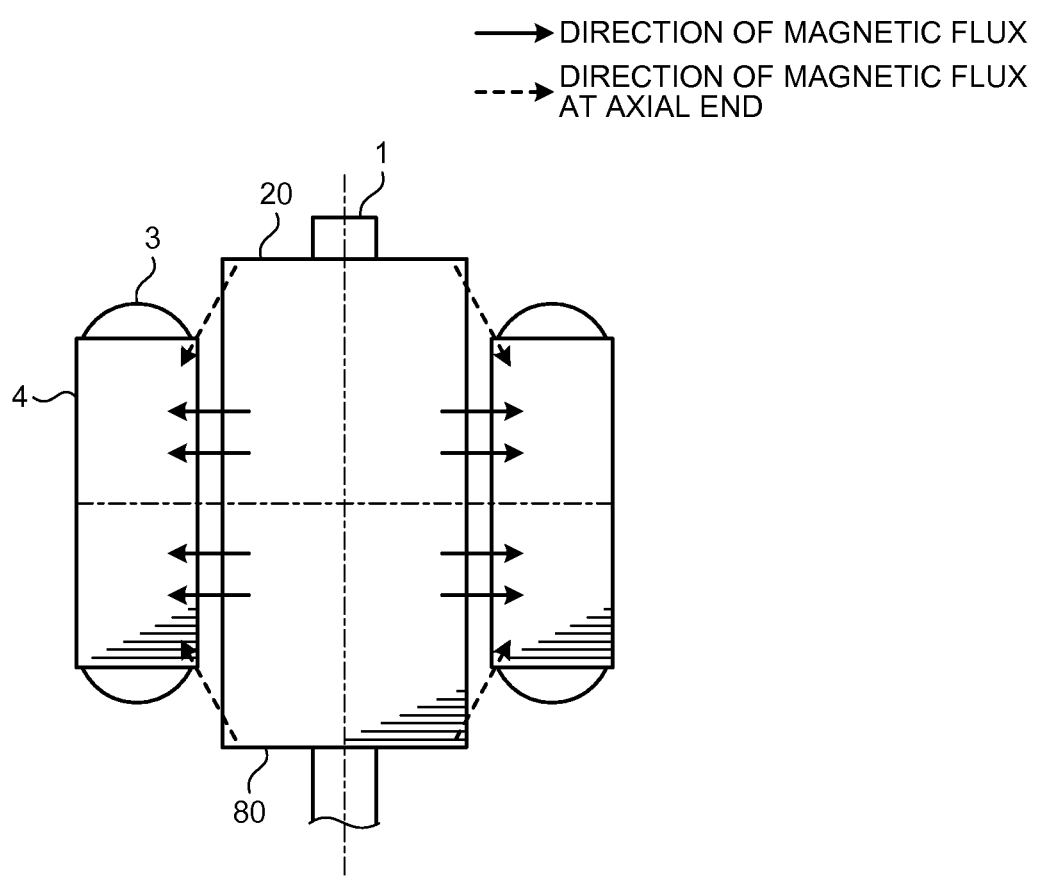
FIG. 5 shows a magnetic flux flowing from a rotor, which is not provided with the outer-peripheral-side core portion, to the stator core.

The relationship is explained with reference to FIG. 5 to FIG. 7. FIG. 5 shows a magnetic flux flowing from a rotor 20, which is not provided with the outer-peripheral-side core portion 8-1, to the stator core 4. It is assumed that the outer-peripheral-side core portion 8-1 shown in FIG. 3 is not provided in the rotor core 80 of the rotor 20 shown in FIG. 5. When only the stator stack thickness is to be increased to improve motor efficiency as described above, only the material of the rotor 20 is increased, and thus the manufacturing cost can be suppressed as compared with a case in which both the rotor stack thickness X and the stator stack thickness Y are increased. However, when the rotor core 80 overhangs, the magnetic flux of the overhanging portion passes through a portion other than a gap between the outer periphery of the rotor core 80 and the inner periphery of the stator core 4, as shown by broken-line arrows shown in FIG. 5, to enter the stator core 4. Therefore, the magnetic flux that passes the portion considerably attenuates, and the degree of the magnetic flux acting on the stator core 4 as the effective magnetic flux decreases, and an effect of increasing the rotor stack thickness X cannot be obtained. To eliminate a magnetic flux loss in the overhanging portion, an axial magnetic path needs to be formed in the rotor 20.

Figure 6:
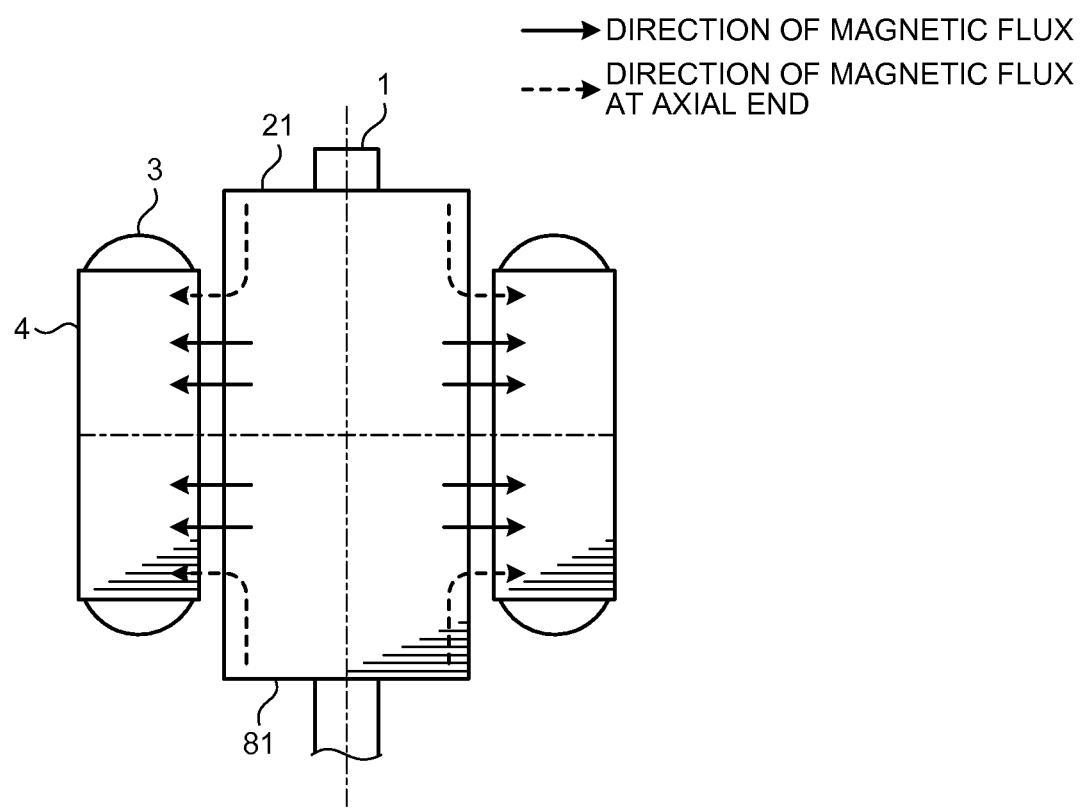
FIG. 6 shows a magnetic flux flowing from a rotor, which is provided with the outer-peripheral-side core portion to the stator core.
Figure 7:
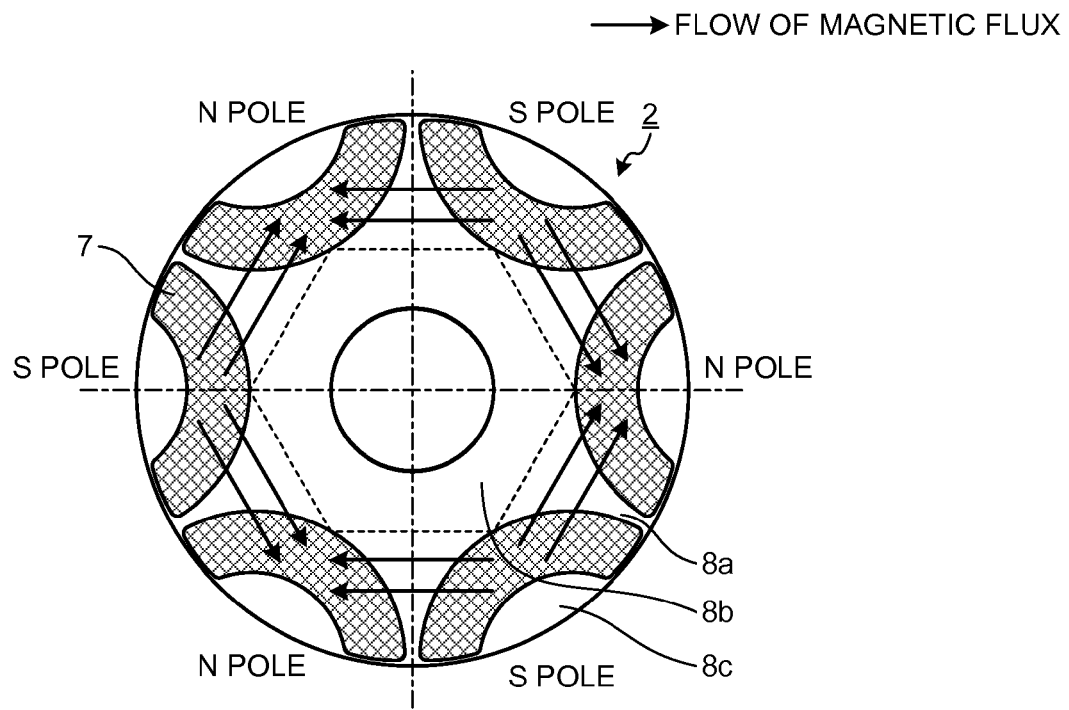
FIG. 7 schematically shows linear flows of a magnetic flux moving between respective magnets.

FIG. 6 shows the magnetic flux flowing from a rotor 21 provided with the outer-peripheral-side core portion 8-1 to the stator core 4. It is assumed that the outer-peripheral-side core portion 8-1 shown in FIG. 3 is provided in a rotor core 81 shown in FIG. 6. In the rotor 21 with this configuration, the magnetic flux generated on the outer periphery of the permanent magnet provided in the overhanging portion passes through the outer-peripheral-side core portion 8-1 as the magnetic path. Therefore, as the broken-line arrows shown in FIG. 6, the magnetic flux enters the stator core 4 via the gap between the outer periphery of the rotor core 81 and the inner periphery of the stator core 4.

When the sectional area of the outer-peripheral-side core portion 8-1 is constant, the magnetic flux density of the outer-peripheral-side core portion 8-1 increases as the overhanging length Z increases, and the effective magnetic flux amount saturates when the overhanging length Z has reached a predetermined length. That is, to obtain the effect (to increase the effective magnetic flux amount) of increasing the overhang amount, the sectional area of the outer-peripheral-side core portion 8-1 through which the magnetic flux passes needs to be increased. In this manner, because the magnetic flux cannot be used efficiently only by increasing the overhanging length Z, the relationship between the sectional area of the rotor core 81 and the area of the outer-peripheral-side core portion 8-1 of the rotor core through which the magnetic flux passes becomes important. On the other hand, because the permissible overhanging amount fluctuates according to the size of the motor, the relationship between the stator stack thickness Y and the rotor stack thickness X becomes important as well.

The interior permanent magnet synchronous motor according to the present embodiment is configured in such a manner that the correlation amount among the sectional area of the rotor core 8, the sectional area of the outer-peripheral-side core portion 8-1 through which the magnetic flux passes, the stator stack thickness Y and the rotor stack thickness X is taken into consideration, so that the rotor stack thickness X satisfies the relational expressions (1) and (2). That is, a minimum value of the rotor stack thickness X is defined in the expression (1), and a maximum value of the rotor stack thickness X is defined in the expression (2). According to the expression (2), when a value of the magnetic force "a" is constant, the maximum value of the rotor stack thickness X increases as a ratio of the sectional area S2 to the sectional area S1 increases. In other words, the sectional area S2 relatively increases as the overhanging length Z increases, and the effect of increasing the overhang amount can be obtained.

The overhanging length Z on one side of the rotor 2 can be expressed by $Z=Y \times S2/S1$, and when it is taken into consideration that the opposite ends of the rotor 2 overhang, a value obtained by adding twice the length ($Z \times 2$) of the overhanging length Z to the stator stack thickness Y becomes the maximum value of the rotor stack thickness X. When the rotor stack thickness X is equal to or larger than the maximum value, it is not effective because the magnetic flux saturates. Magnetic saturation of the outer-peripheral-side core portion 8-1 is also affected by the magnitude of the magnetic force "a" inserted into the rotor 2. The magnetic flux density of a general magnet 7 is 0.3 to 1.5 T (tesla), and the influence of the magnetic force "a" to the overhang amount can be expressed by a reciprocal of the magnetic force "a". That is, as the magnetic force "a" becomes weaker, the permissible overhanging amount of the rotor 2 increases, and as the magnetic force "a" becomes stronger, the permissible overhanging amount of the rotor 2 is restricted.

The reason why the sectional area S3 is subtracted from the sectional area S1 to be used in the relational expression (2) is explained here. FIG. 7 schematically shows a linear flow of the magnetic flux moving between the adjacent magnets 7. The magnetic flux flowing between the adjacent magnets 7 moves linearly in the direction shown by arrows inside the rotor core 8. This is because the magnetic flux has a tendency to pass through a route having a low magnetic resistance when it passes through the electromagnetic steel plate, and for example, the portion (the center side core 8b) surrounded by a hexagonal broken line in FIG. 7 is not used as a magnetic circuit (is not used as the magnetic path).

Figure 8:
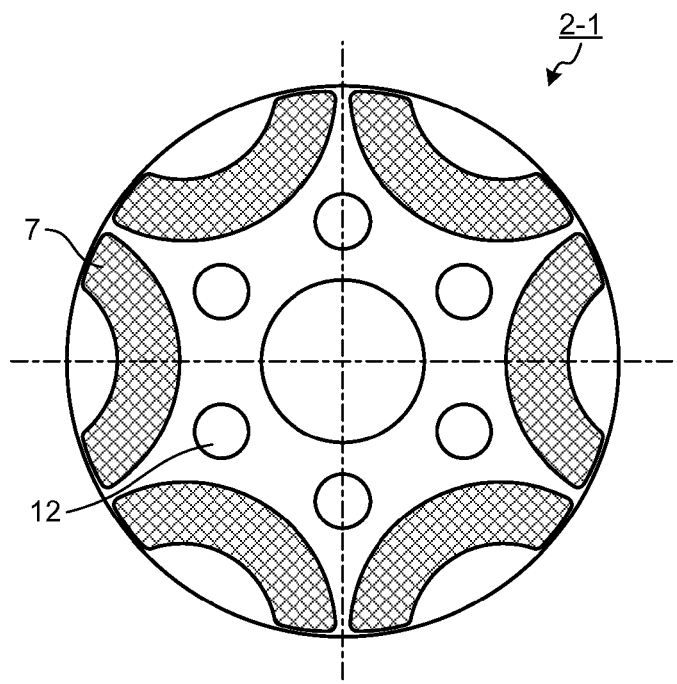
FIG. 8 is a sectional view of a rotor in which air holes are formed in the rotor core.
Figure 9:
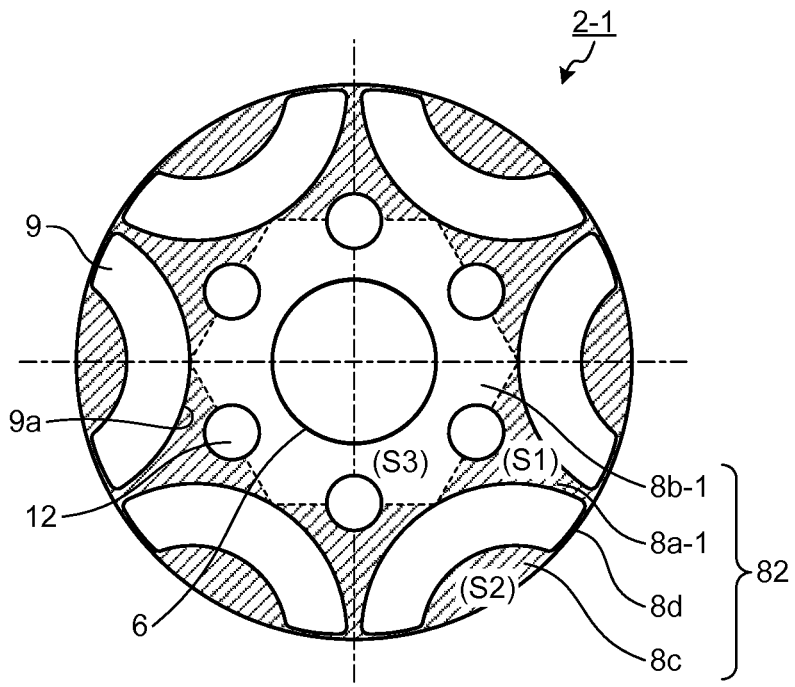
FIG. 9 is an explanatory diagram of the relation between a sectional area S1 and a sectional area S3 in the rotor shown in FIG. 8.

FIG. 8 is a sectional view of a rotor 2-1 in which air holes are formed in the rotor core. FIG. 9 is an explanatory diagram of the relation between the sectional area S1 and the sectional area S3 in the rotor 2-1 shown in FIG. 8. In the following descriptions, constituent elements identical to those in the FIGS. 1 to 7 are denoted by the same reference signs, explanations thereof will be omitted, and only different constituent elements are described herein.

Communication holes 12, through which a refrigerant, refrigerant oil and the like pass, are provided between the inner periphery 6 of the rotor 2-1 and the magnet 7 (the magnet housing hole 9). Because the communication holes 12 form an air space, the magnetic flux cannot pass through the communication holes 12. Accordingly, the sectional area of the communication holes 12 needs to be omitted from the sectional area S1 of the inner-peripheral side core 8a-1. In the rotor 2-1 provided with the communication holes 12, an area obtained by subtracting the sectional area S3 of the center side core 8b-1, the sectional area of the communication holes 12, and the sectional area S2 of the outer-peripheral side core 8c from the sectional area of a rotor core 82 is used as the sectional area S1 to be used in the expression (2). The center side core 8b-1 is a portion (a portion surrounded by a hexagonal broken line) surrounded by a line connecting the centers of the inner-diameter side surfaces 9a of the respective magnet housing holes 9.

The sectional area S2 shown in FIG. 9 is a sectional area of the outer-peripheral-side core portion 8-1 obtained by adding the outer-peripheral side thin core 8d and the outer-peripheral side core 8c as in the sectional area S2 shown in FIG. 3. In the present embodiment, because the expression (2) is established if the outer-peripheral-side core portion 8-1 is provided, the expression (2) can be applied regardless of the number of magnets, the shape of magnetic pole, and the number of poles.

Figure 10:
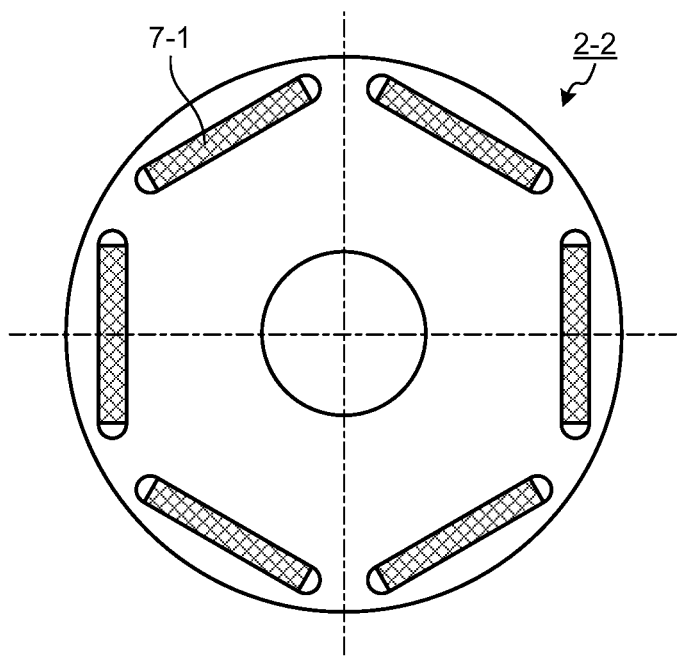
FIG. 10 shows a first modification of the rotor.
Figure 11:
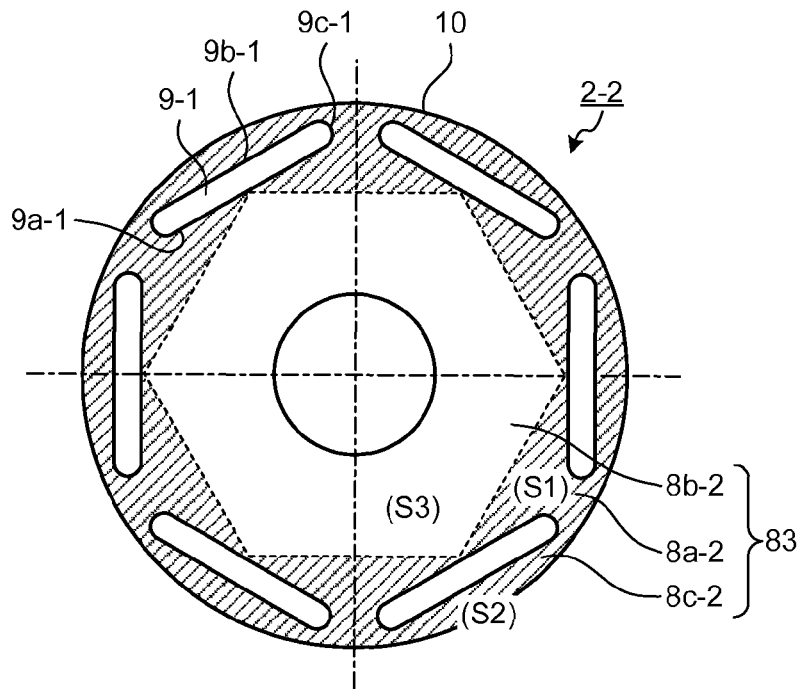
FIG. 11 is an explanatory diagram of a sectional area of the rotor shown in FIG. 10.
Figure 12:
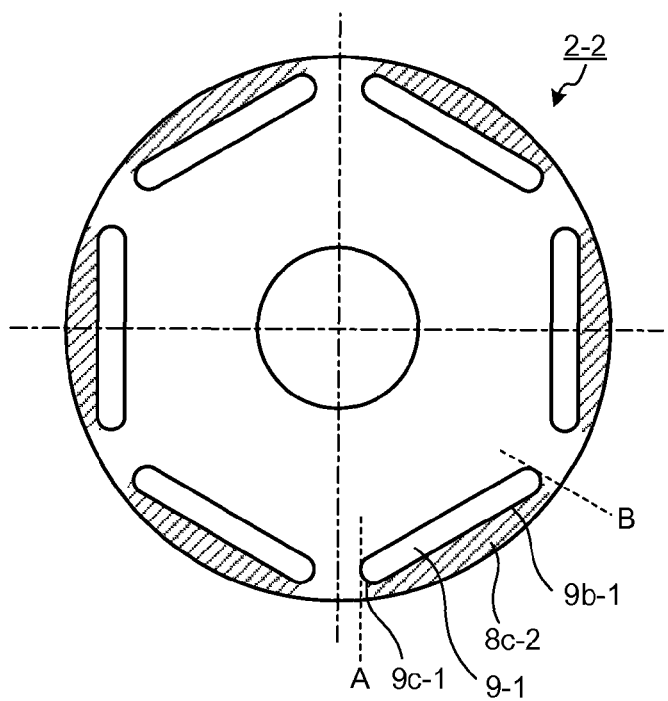
FIG. 12 is an explanatory diagram of an outer-peripheral-side core portion of the rotor shown in FIG. 10.

FIG. 10 shows a first modification of the rotor. FIG. 11 is an explanatory diagram of the sectional area of a rotor 2-2 shown in FIG. 10. FIG. 12 is an explanatory diagram of an outer-peripheral-side core portion of the rotor 2-2 shown in FIG. 10. In the following descriptions, constituent elements identical to those in the FIGS. 1 to 9 are denoted by the same reference signs, explanations thereof will be omitted, and only different constituent elements are described herein.

FIG. 11 shows the rotor 2-2 having a rotor core 83 in which flat plate-like magnet housing holes 9 provided on the same circumference and extending in the circumferential direction are formed. As shown in FIG. 10, a flat plate-like magnet 7-1 is housed in each magnet housing hole 9-1.

The rotor core 83 includes an inner-peripheral side core 8a-2, a center side core 8b-2, and an outer-peripheral side core 8c-2, and the outer-peripheral side core 8c-2 corresponds to the outer-peripheral-side core portion 8-1 in FIG.

2. That is, as shown in FIG. 12, a portion, which is surrounded by tangent lines A and B that come in contact with outer peripheral edge portions where each magnet housing hole 9-1 comes closest to adjacent other magnet housing holes, the outer periphery 10, a circumferential end 9c-1 of the magnet housing hole 9-1, and an outer-diameter side surface 9b-1 of the magnet housing hole 9-1 corresponds to the outer-peripheral-side core portion 8-1. The center side core 8b-2 is a portion (a portion surrounded by a hexagonal broken line) surrounded by a line connecting the centers of the inner-diameter side surfaces 9a-1 of the respective magnet housing holes 9-1.

FIG. 11 shows the sectional area S1 of the inner-peripheral side core 8a-2, the sectional area S2 of the outer-peripheral-side core portion (the outer-peripheral side core 8c-2), and the sectional area S3 of the center side core 8b-2, and the total sum of these sectional areas S1 to S3 is the sectional area of the rotor core 83. The sectional area S1 indicates an area obtained by subtracting the sectional area S2 and the sectional area S3 from the sectional area of the rotor core 83. Even in this configuration, the overhang effect can be expected because the outer-peripheral-side core portion (the outer-peripheral side core 8c-2) is present.

Figure 13:
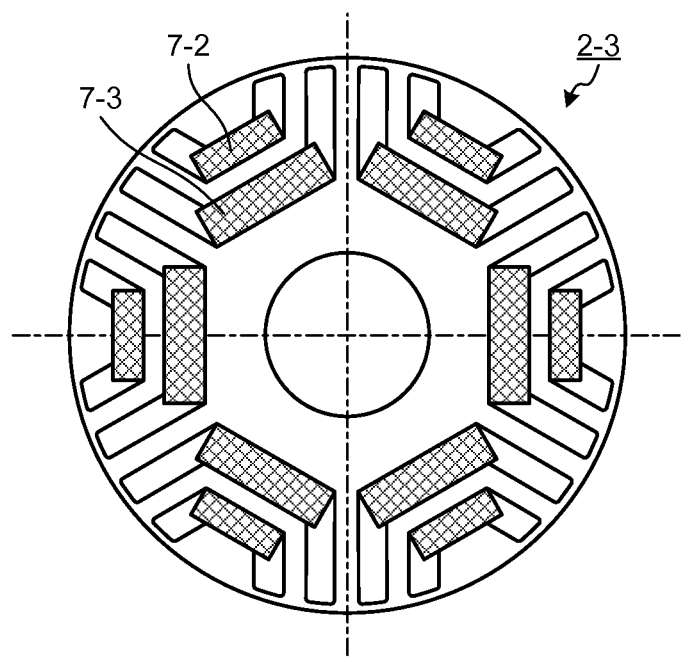
FIG. 13 shows a second modification of the rotor.
Figure 14:
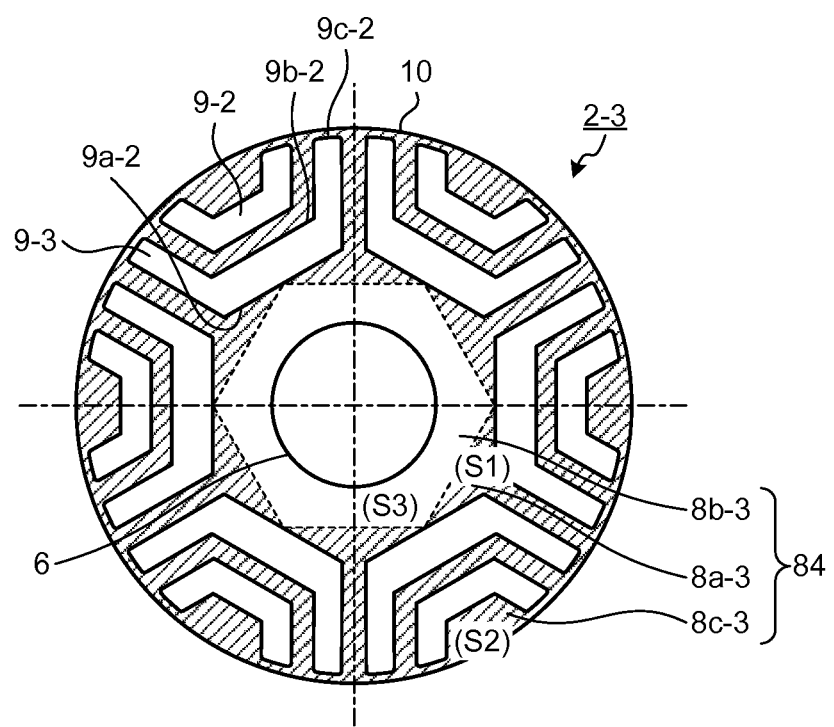
FIG. 14 is an explanatory diagram of a sectional area of the rotor shown in FIG. 13.
Figure 15:
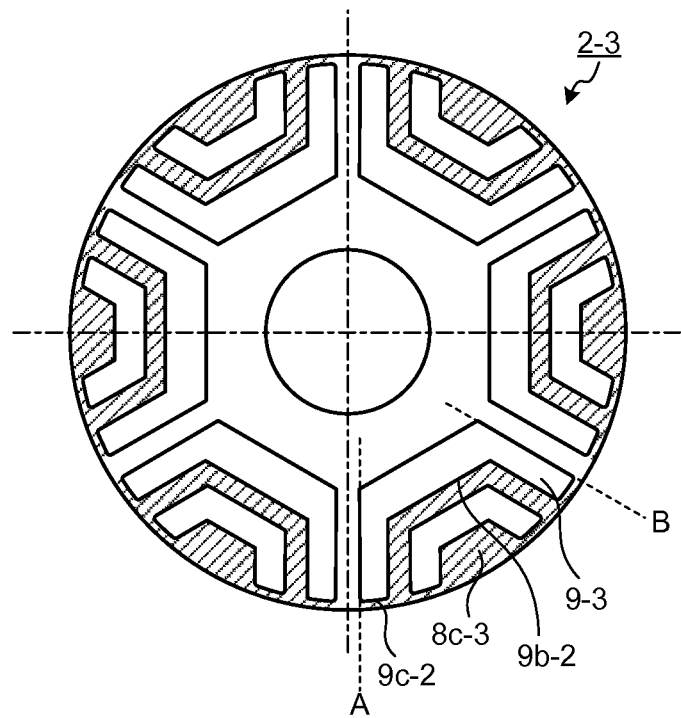
FIG. 15 is an explanatory diagram of an outer-peripheral-side core portion of the rotor shown in FIG. 13.

FIG. 13 shows a second modification of the rotor. FIG. 14 is an explanatory diagram of the sectional area of a rotor 2-3 shown in FIG. 13. FIG. 15 is an explanatory diagram of an outer-peripheral-side core portion of the rotor 2-3 shown in FIG. 13. In the following descriptions, constituent elements identical to those in the FIGS. 1 to 9 are denoted by the same reference signs, explanations thereof will be omitted, and only different constituent elements are described herein.

In the interior permanent magnet synchronous motor, a rotor in which a plurality of magnets are used for one pole may be used. FIG. 14 shows, as an example of such a rotor, the rotor 2-3 having a rotor core 84 in which two-layer magnet housing holes (9-2, 9-3) are formed on the same circumference and are divided in a radial direction is shown. The first magnet housing holes 9-2 are each arranged on the side of the outer periphery 10 of the rotor core 84 and is formed in a C shape or a U shape protruding toward the inner periphery 6. The second magnet housing holes 9-3 are each arranged closer rather to the side of the inner periphery 6 than the first magnet housing hole 9-2 and is formed in a similar shape to that of the first magnet housing hole 9-2. As shown in FIG. 13, a flat plate-like magnet 7-2 is housed at the center of each of the first magnet housing holes 9-2, and a flat plate-like magnet 7-3 is housed at the center of each of the second magnet housing holes 9-3.

The rotor core 84 includes an inner-peripheral side core 8a-3, a center side core 8b-3, and an outer-peripheral side core 8c-3 and the outer-peripheral side core 8c-3 corresponds to the outer-peripheral-side core portion 8-1 in FIG. 2. That is, as shown in FIG. 15, the portion (the outer-peripheral side core 8c-3), which is surrounded by tangent lines A and B that come in contact with outer peripheral edge portions where each second magnet housing hole 9-3 comes closest to adjacent other magnet housing holes, the outer periphery 10, a circumferential end 9c-2 of the second magnet housing hole 9-3, and an outer-diameter side surface 9b-2 of the second magnet housing hole 9-3, corresponds to the outer-peripheral-side core portion 8-1. The center side core 8b-3 is a portion (a portion surrounded by a hexagonal broken line) surrounded by a line connecting the centers of the inner-diameter side surfaces 9a-2 of the respective second magnet housing holes 9-3.

FIG. 14 shows the sectional area S1 of the inner-peripheral side core 8a-3, the sectional area S2 of the outer-peripheral-side core portion (the outer-peripheral side core 8c-3), and the sectional area S3 of the center side core 8b-3. The total sum of these sectional areas S1 to S3 is the sectional area of the rotor core 84, and the sectional area S1 indicates an area obtained by subtracting the sectional area S2 and the sectional area S3 from the sectional area of the rotor core 84. Even in this configuration, the overhang effect can be expected because the outer-peripheral-side core portion (the outer-peripheral side core 8c-3) is present. In FIG. 13 to FIG. 15, the rotor 2-3 using the two-layer magnets in the radial direction is shown. However, the similar effect can be expected even by a rotor using magnets formed in three layers or more in the radial direction.

Figure 16:
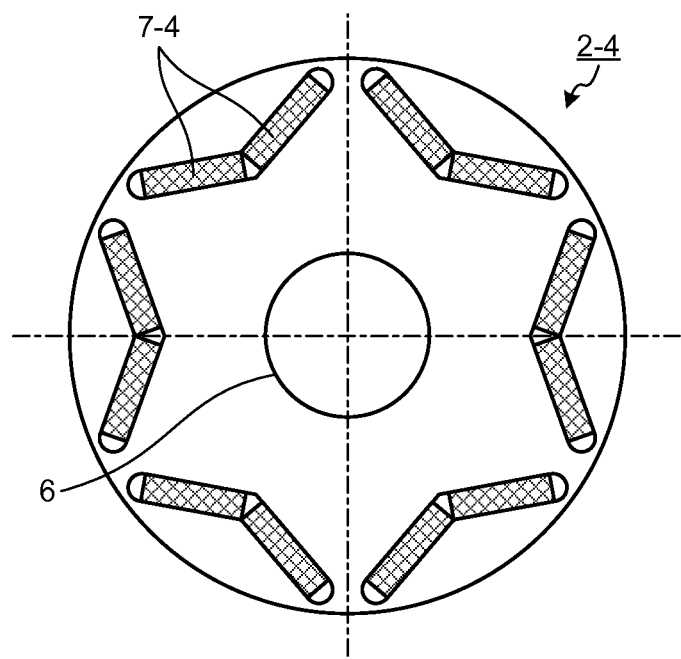
FIG. 16 shows a third modification of the rotor.
Figure 17:
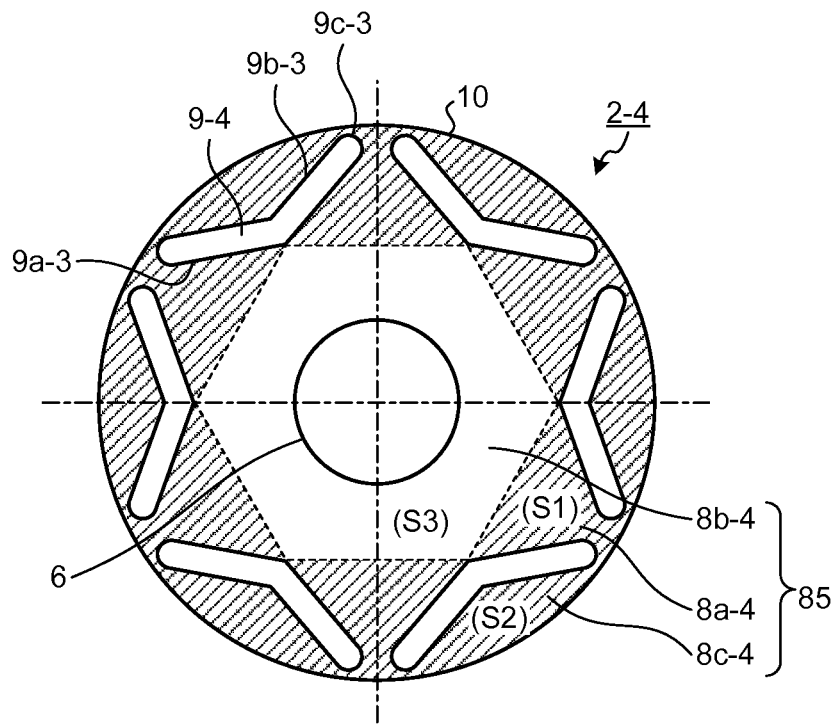
FIG. 17 is an explanatory diagram of a sectional area of the rotor shown in FIG. 16.
Figure 18:
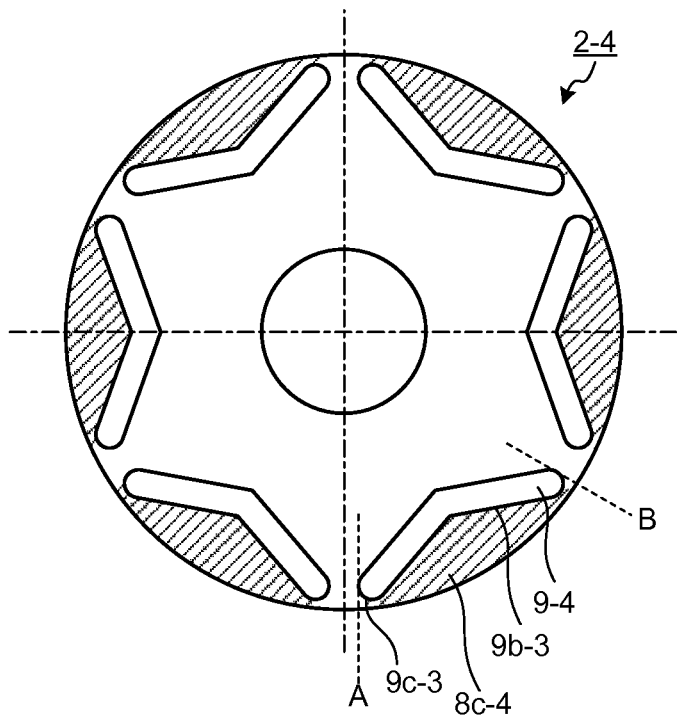
FIG. 18 is an explanatory diagram of an outer-peripheral-side core portion of the rotor shown in FIG. 16.

FIG. 16 shows a third modification of the rotor. FIG. 17 is an explanatory diagram of the sectional area of a rotor 2-4 shown in FIG. 16. FIG. 18 is an explanatory diagram of an outer-peripheral-side core portion of the rotor 2-4 shown in FIG. 16. In the following descriptions, constituent elements identical to those in the FIGS. 1 to 9 are denoted by the same reference signs, explanations thereof will be omitted, and only different constituent elements are described herein.

FIG. 17 shows the rotor 2-4 having a rotor core 85 formed with V-shaped magnet housing holes 9-4 provided on the same circumference and protruding toward the inner periphery 6. As shown in FIG. 16, a flat plate-like magnet 7-4 is housed in each linear portion of the magnet housing holes 9-4.

The rotor core 85 includes an inner-peripheral side core 8a-4, a center side core 8b-4, and an outer-peripheral side core 8c-4, and the outer-peripheral side core 8c-4 corresponds to the outer-peripheral-side core portion 8-1. That is, as shown in FIG. 18, the portion (the outer-peripheral side core 8c-4), which is surrounded by tangent lines A and B that come in contact with outer peripheral edge portions where each magnet housing hole 9-4 comes closest to its adjacent magnet housing holes, the outer periphery 10, a circumferential end 9c-3 of the magnet housing hole 9-4, and an outer-diameter side surface 9b-3 of the magnet housing hole 9-4 corresponds to the outer-peripheral-side core portion 8-1. The center side core 8b-4 is a portion (a portion surrounded by a hexagonal broken line) surrounded by a line connecting the centers of the inner-diameter side surfaces 9a-3 of the respective magnet housing holes 9-4.

FIG. 17 shows the sectional area S1 of the inner-peripheral side core 8a-4, the sectional area S2 of the outer-peripheral-side core portion (the outer-peripheral side core 8c-4), and the sectional area S3 of the center side core 8b-4. The total sum of these sectional areas S1 to S3 is the sectional area of the rotor core 85, and the sectional area S1 indicates an area obtained by subtracting the sectional area S2 and the sectional area S3 from the sectional area of the rotor core 85. Even in this configuration, the overhang effect can be expected because the outer-peripheral-side core portion is present.

As explained above, the interior permanent magnet synchronous motor includes the rotor core 8 formed by stacking a plurality of electromagnetic steel plates, and the stator core 4 arranged on the outer peripheral side of the rotor core 8 formed by stacking a plurality of electromagnetic steel plates. Three or more magnet housing holes 9 (9-1 to 9-4) that respectively house the magnet 7 (7-1 to 7-4) arranged in the number corresponding to the number of poles in the circumferential direction of the rotor core 8 and constituting a magnetic pole are formed in the rotor core 8 in the circumferential direction. When it is assumed that the stack thickness of the rotor core 8 is X, the stack thickness of the stator core 4 is Y, the sectional area of a core portion surrounded by the line connecting midpoints of the inner diameter side surface 9a (9a-1 to 9a-3) of each of the magnet housing holes 9 is S3, the sectional area of the outer-peripheral-side core portion 8-1 provided between the outer diameter side surface 9b (9b-1 to 9b-3) of each of the magnet housing holes 9 and the outer periphery 10 of the rotor core 8 is S2, and the sectional area obtained by subtracting the sectional area S2 and the sectional area S3 from the sectional area of the rotor core 8 is S1, then the rotor stack thickness is formed so as to satisfy the relation of X>Y and X<Y(1+(S2/S1)×2).

Accordingly, the effect of increasing the overhang amount can be obtained without increasing the size of the stator core 4. Consequently, further reduction of the manufacturing cost can be achieved while realizing high efficiency of the motor. As a result, downsizing and volume reduction of the motor body can be achieved, and volume reduction of packaging materials of the motor can be achieved as well. Further, with the improvement of the efficiency, an energy consumption amount can be reduced more than in the conventional motor, and thus a motor preferable from the viewpoint of LCA (Life Cycle Assessment) can be provided.

As shown in FIG. 3 and FIG. 4, each of the magnet housing holes 9 is formed such that the center of curvature is formed in an arcuate shape and is positioned outside in the radial direction of the rotor core 8 and the circumferential end 9c is positioned near the outer periphery 10 of the rotor core 8. The outer-peripheral-side core portion 8-1 is formed to be the portion, which is surrounded by tangent lines A and B that come in contact with outer peripheral edge portions where each magnet housing hole 9 comes closest to adjacent other magnet housing holes, the outer periphery 10 of the rotor core 8, the circumferential end 9c, and the outer-diameter side surface 9b. Therefore, even if each of the magnet housing holes 9 is formed in an inverted arcuate shape, the magnetic flux near the axial end of the rotor 2 can pass through the outer-peripheral-side core portion 8-1 and can be taken into the stator core 4 efficiently, thereby enabling to achieve high magnetization.

As shown in FIG. 11 and FIG. 12, each of the magnet housing holes 9-1 is formed in a flat plate-like shape extending in the circumferential direction. The outer-peripheral-side core portion 8-1 is formed to be the portion, which is surrounded by tangent lines A and B that come in contact with outer peripheral edge portions where each magnet housing hole 9-1 comes closest to adjacent other magnet housing holes, the outer periphery 10 of the rotor core 83, the circumferential end 9c-1 of the magnet housing hole 9-1, and the outer-diameter side surface 9b-1 of the magnet housing hole 9-1. Therefore, even if each of the magnet housing holes 9-1 is formed in a flat plate-like shape, the magnetic flux near the axial end of the rotor 2 can pass through the outer-peripheral-side core portion 8-1 and can be taken into the stator core 4 efficiently, thereby enabling to achieve high magnetization.

As shown in FIG. 14 and FIG. 15, each of the magnet housing holes includes the first magnet housing hole 9-2 provided on the outer peripheral side of the rotor core 84 and having a U shape protruding toward the inner periphery 6 of the rotor core 84, and the second magnet housing hole 9-3 arranged between the first magnet housing hole 9-2 and the inner periphery 6 of the rotor core 84 and having a similar shape to that of the first magnet housing hole 9-2. The outer-peripheral-side core portion 8-1 is formed to be the portion, which is surrounded by tangent lines A and B that come in contact with outer peripheral edge portions where each second magnet housing hole 9-3 comes closest to adjacent other magnet housing holes, the outer periphery 10, the circumferential end 9c-2, and the outer-diameter side surface 9b-2. Therefore, even if the magnet housing hole is formed in a U shape, the magnetic flux near the axial end of the rotor 2 can pass through the outer-peripheral-side core portion 8-1 and can be taken into the stator core 4 efficiently, thereby enabling to achieve high magnetization.

As shown in FIG. 17 and FIG. 18, each of the magnet housing holes 9-4 is formed in a V shape protruding toward the inner periphery 6 of the rotor core 85. The outer-peripheral-side core portion 8-1 is formed to be the portion, which is surrounded by tangent lines A and B that come in contact with outer peripheral edge portions where each second magnet housing hole 9-4 comes closest to adjacent other magnet housing holes, the outer periphery 10 of the rotor core 84, the circumferential end 9c-3, and the outer-diameter side surface 9b-3. Therefore, even if the magnet housing hole 9-4 is formed in a V shape, the magnetic flux near the axial end of the rotor 2 can pass through the outer-peripheral-side core portion 8-1 and can be taken into the stator core 4 efficiently, thereby enabling to achieve high magnetization.

In the interior permanent magnet synchronous motor according to the present embodiment, the rotor core and the stator core formed by stacking a plurality of electromagnetic steel plates are used in order to reduce eddy current loss. However, the shape of the rotor core and that of the stator core are not limited to those formed by stacking the plurality of electromagnetic steel plates.

The configuration of the interior permanent magnet synchronous motor according to the embodiment of the present invention is only an example of the contents of the present invention. The configuration can be combined with other well-known techniques, and it is needless to mention that the present invention can be configured while modifying it without departing from the scope of the invention, such as omitting a part of the configuration.

INDUSTRIAL APPLICABILITY

As described above, the present invention is applicable to an interior permanent magnet synchronous motor, and is particularly useful as an invention that can achieve further reduction of the manufacturing cost while realizing high efficiency of the motor.

The invention claimed is:

1. An interior permanent magnet synchronous motor comprising:
a rotor core formed by stacking a plurality of electromagnetic steel plates; and
a stator core arranged on an outer peripheral side of the rotor core formed by stacking a plurality of electromagnetic steel plates, wherein
three or more magnet housing holes for housing magnets, which are arranged in number corresponding to the number of poles in a circumferential direction of the rotor core and constitute a magnetic pole are formed in the rotor core in the circumferential direction, and
wherein a stack thickness of the rotor core is X, a stack thickness of the stator core is Y, a sectional area of a core portion surrounded by a line connecting midpoints of an inner diameter side surface of each of the magnet housing holes is S3, a sectional area of an outer-peripheral-side core portion provided between an outer diameter side surface of each of the magnet housing holes and an outer periphery of the rotor core is S2, and a sectional area obtained by subtracting the sectional area S2 and the sectional area S3 from a sectional area of the rotor core is S1, the stack thickness of the rotor core is formed so as to satisfy the relation of X>Y and X<Y(1+(S2/S1)×2).

2. The interior permanent magnet synchronous motor according to claim 1, wherein each of the magnet housing holes is formed in an arcuate shape having a center of curvature positioned outside of the rotor core in the radial direction and a circumferential end positioned near the outer periphery of the rotor core.

3. The interior permanent magnet synchronous motor according to claim 1, wherein each of the magnet housing holes extends in the circumferential direction and is formed in a flat plate-like shape.

4. The interior permanent magnet synchronous motor according to claim 1, wherein each of the magnet housing holes is formed by a first magnet housing hole provided on an outer peripheral side of the rotor core and having a U shape protruding toward an inner periphery of the rotor core, and a second magnet housing hole arranged between the first magnet housing hole and the inner periphery of the rotor core and having a similar shape to that of the first magnet housing hole.

5. The interior permanent magnet synchronous motor according to claim 1, wherein each of the magnet housing holes is formed in a V shape protruding toward an inner periphery of the rotor core.

* * * * *